US012546151B2

(12) United States Patent
Balcom

(10) Patent No.: US 12,546,151 B2
(45) Date of Patent: Feb. 10, 2026

(54) DEADBOLT DOOR LOCKING APPARATUS

(71) Applicant: Derric Balcom, Canton, MI (US)

(72) Inventor: Derric Balcom, Canton, MI (US)

( * ) Notice: Subject to any disclaimer, the term of this patent is extended or adjusted under 35 U.S.C. 154(b) by 0 days.

(21) Appl. No.: 16/180,282

(22) Filed: Nov. 5, 2018

(65) Prior Publication Data

US 2019/0071901 A1 Mar. 7, 2019

Related U.S. Application Data

(63) Continuation-in-part of application No. 14/966,573, filed on Dec. 11, 2015, now abandoned.
(Continued)

(51) Int. Cl.
*E05C 1/04* (2006.01)
*E05B 9/02* (2006.01)
(Continued)

(52) U.S. Cl.
CPC .................. *E05C 1/04* (2013.01); *E05B 9/02* (2013.01); *E05B 15/0205* (2013.01);
(Continued)

(58) Field of Classification Search
CPC .......... E05C 1/04; E05C 9/004; E05C 19/182; E05C 1/004; E05C 1/02; E05C 19/003; E05B 9/00; E05B 9/002; E05B 9/02; E05B 9/08; E05B 15/02; E05B 15/0205; E05B 17/2084; E05B 63/0004; E05B 63/0017; E05B 63/0052; E05B 67/383; E05B 15/022; E05B 17/2003; E05B 63/24; E05B 63/244; Y10S 292/51; Y10S 292/63; Y10S 70/63; Y10T 292/096; Y10T 292/1014; Y10T 292/1022; Y10T 292/432; Y10T 292/68; Y10T 292/683; Y10T 292/79; Y10T 292/37; Y10T 292/379; Y10T 292/388; Y10T 292/65; Y10T 292/696
(Continued)

(56) References Cited

U.S. PATENT DOCUMENTS

| | | |
|---|---|---|
| 15,094 A | 6/1856 | Warner |
| 22,469 A | 12/1858 | Yates |

(Continued)

FOREIGN PATENT DOCUMENTS

| | | |
|---|---|---|
| GB | 2272726 A | 5/1994 |
| GB | 2275961 A | 9/1994 |
| JP | H05179856 A | 7/1993 |

*Primary Examiner* — Alyson M Merlino
(74) *Attorney, Agent, or Firm* — MaxGoLaw PLLC

(57) ABSTRACT

A deadbolt door locking apparatus for a side hinged door is provided that includes a deadbolt having a longitudinal axis. The deadbolt has a handle protruding therefrom. A housing for the deadbolt has an aperture external face. The handle slides in the aperture between an extended position with the deadbolt overlying the door, and a retracted position with the deadbolt clear of the door. The housing has a first wall and a second wall that together bound the deadbolt and connecting the external face to a door frame mounting plate. A mounting plate having a cut-out adapted to receive a door latch extending from the door into a door jamb is provided that is integral with the housing and extending perpendicular therefrom. The mounting plate has a length of at least twice the extended position of the deadbolt.

13 Claims, 3 Drawing Sheets

Related U.S. Application Data

(60) Provisional application No. 62/090,421, filed on Dec. 11, 2014.

(51) Int. Cl.
*E05B 15/02* (2006.01)
*E05B 63/00* (2006.01)
*E05B 67/38* (2006.01)

(52) U.S. Cl.
CPC ........ *E05B 67/383* (2013.01); *E05B 63/0004* (2013.01); *E05B 63/0052* (2013.01)

(58) Field of Classification Search
USPC ....... 292/137, 138, 145, 302, 340, 341, 346, 292/DIG. 51, DIG. 63, 289, 292, 295
See application file for complete search history.

(56) References Cited

U.S. PATENT DOCUMENTS

| | | | | | |
|---|---|---|---|---|---|
| 164,688 | A | | 6/1875 | Marks | |
| 264,438 | A | | 9/1882 | Burrill | |
| 290,400 | A | | 12/1883 | Coe | |
| 822,189 | A | | 5/1906 | Crecelius | |
| 826,538 | A | * | 7/1906 | Carter | E05C 19/182 292/292 |
| 1,207,925 | A | | 12/1916 | Kacenga | |
| 1,245,049 | A | | 10/1917 | Silverstein | |
| 1,368,711 | A | | 2/1921 | Foley | |
| 1,409,152 | A | | 3/1922 | Collins | |
| 1,570,072 | A | | 1/1926 | Merz et al. | |
| 1,627,725 | A | | 5/1927 | Bradley et al. | |
| 1,720,042 | A | | 7/1929 | Hankwitz | |
| 2,503,044 | A | * | 4/1950 | Guerra | E05B 17/106 70/381 |
| 2,613,970 | A | * | 10/1952 | Holmsten | E05C 1/04 292/148 |
| 3,633,955 | A | * | 1/1972 | Read | E05B 15/0205 292/292 |
| 3,640,558 | A | | 2/1972 | Gewertz et al. | |
| 3,655,229 | A | | 4/1972 | Tumbiolo | |
| 4,095,828 | A | * | 6/1978 | East | E05B 67/383 292/148 |
| 4,205,868 | A | * | 6/1980 | Kurth | E05B 85/08 292/346 |
| 4,341,408 | A | * | 7/1982 | Blevins | E05C 1/04 70/417 |
| 4,690,445 | A | * | 9/1987 | Hartley | E05B 15/0205 292/147 |
| 4,815,774 | A | | 3/1989 | Correnti | |
| 4,898,411 | A | | 2/1990 | Ocello et al. | |
| 5,080,354 | A | * | 1/1992 | McDougall | E05C 1/04 292/DIG. 17 |
| 5,280,976 | A | | 1/1994 | Melyon | |
| 5,427,422 | A | * | 6/1995 | Madlener | E05B 17/2088 292/264 |
| 6,641,185 | B2 | | 11/2003 | Hale et al. | |
| 6,684,570 | B1 | | 2/2004 | Robledo | |
| 6,938,376 | B2 | | 9/2005 | Youssef | |
| 7,648,180 | B2 | | 1/2010 | Petry | |
| 7,798,544 | B1 | * | 9/2010 | Bates | E05C 1/04 292/137 |
| 8,381,558 | B2 | | 2/2013 | Alef | |
| 9,562,377 | B2 | * | 2/2017 | Attard | E05B 67/383 |

* cited by examiner

DEADBOLT DOOR LOCKING APPARATUS

RELATED APPLICATIONS

This application is a continuation-in-part of U.S. application Ser. No. 14/966,573 filed Dec. 11, 2015; that in turn is a non-provisional application that claims priority benefit of U.S. Provisional Application Ser. No. 62/090,421 filed Dec. 11, 2014; the contents of which are hereby incorporated by reference.

FIELD OF THE INVENTION

The present invention relates to the field of deadbolt locks and more particularly relates to a deadbolt door locking apparatus that provides a level of strength and durability to a door, a door frame, and a deadbolt and also affords a level of security and protection from unauthorized intrusion into a structure.

BACKGROUND OF THE INVENTION

Doors provide a mode of entry into, and exit from, structures while also serving as a barrier between the exterior and interior of structures. Doors often have a means of securing structures from unauthorized entry. A typical method includes the use of a key-actuated lock imbedded into a door knob that can be locked and unlocked from the exterior of a structure using a key and can also be locked and unlocked from the interior of a structure by turning a knob or pushing a button. Doors commonly include a second locking mechanism used in conjunction with a door knob lock—a deadbolt imbedded into a door that, when engaged, slides out from a door and into a door jamb. Deadbolt locks are typically key-actuated from the exterior of a structure and are locked and unlocked from the interior of a structure by turning a knob.

Adaptable for use in securing a wide variety of structures ranging from domestic homes, warehouses, commercial buildings, factories and storage facilities, deadbolts are one of the most common door locking mechanisms in use globally. The size, length, width and material of a deadbolt can be easily altered for optimal use in securing doorways with specific design features and structures with specific security requirements. Perhaps a result of such adaptability, the core design of the common deadbolt, since its inception, has been minimally altered and flaws remain.

The typical deadbolt lock is imbedded within a door. When engaged, the deadbolt slides out from a housing within a door and into a housing imbedded into a door jamb adapted to receive the deadbolt. The brunt of the load bearing capacity is localized at the deadbolt housing imbedded into the door. This creates a force resistant weakness towards the center of the deadbolt that often results in the door frame acting as a second load bearing endpoint, at the point where the deadbolt is received by the door jamb housing. Two significant negative results stem from this design—(1) this design makes a door frame prone to cracking when pressure and force are exerted upon the exterior of a door such as that exerted by a potential intruder attempting to gain unauthorized access into a structure; and (2) this design makes the deadbolt prone to snapping.

Thus, there exists a need for a deadbolt door locking apparatus that provides a degree of force resistant and load bearing uniformity spread in a continuum across the entire apparatus so as to alleviate localized stress on a deadbolt and door frame to maximize the overall strength and durability of the deadbolt door locking apparatus as well as maximize the overall security of a structure by guarding against unauthorized intrusion resulting from deadbolt or door frame failure.

SUMMARY OF THE INVENTION

A deadbolt door locking apparatus for a side hinged door is provided that includes a deadbolt having a longitudinal axis. The deadbolt has a handle protruding therefrom. A housing for the deadbolt has an aperture external face. The handle slides in the aperture between an extended position with the deadbolt overlying the door, and a retracted position with the deadbolt clear of the door. The housing has a first wall and a second wall that together bound the deadbolt and connecting the external face to a door frame mounting plate. A mounting plate having a cut-out adapted to receive a door latch extending from the door into a door jamb is provided that is integral with the housing and extending perpendicular therefrom. The mounting plate has a length of at least twice the extended position of the deadbolt.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE PREFERRED EMBODIMENTS

Figure 1:
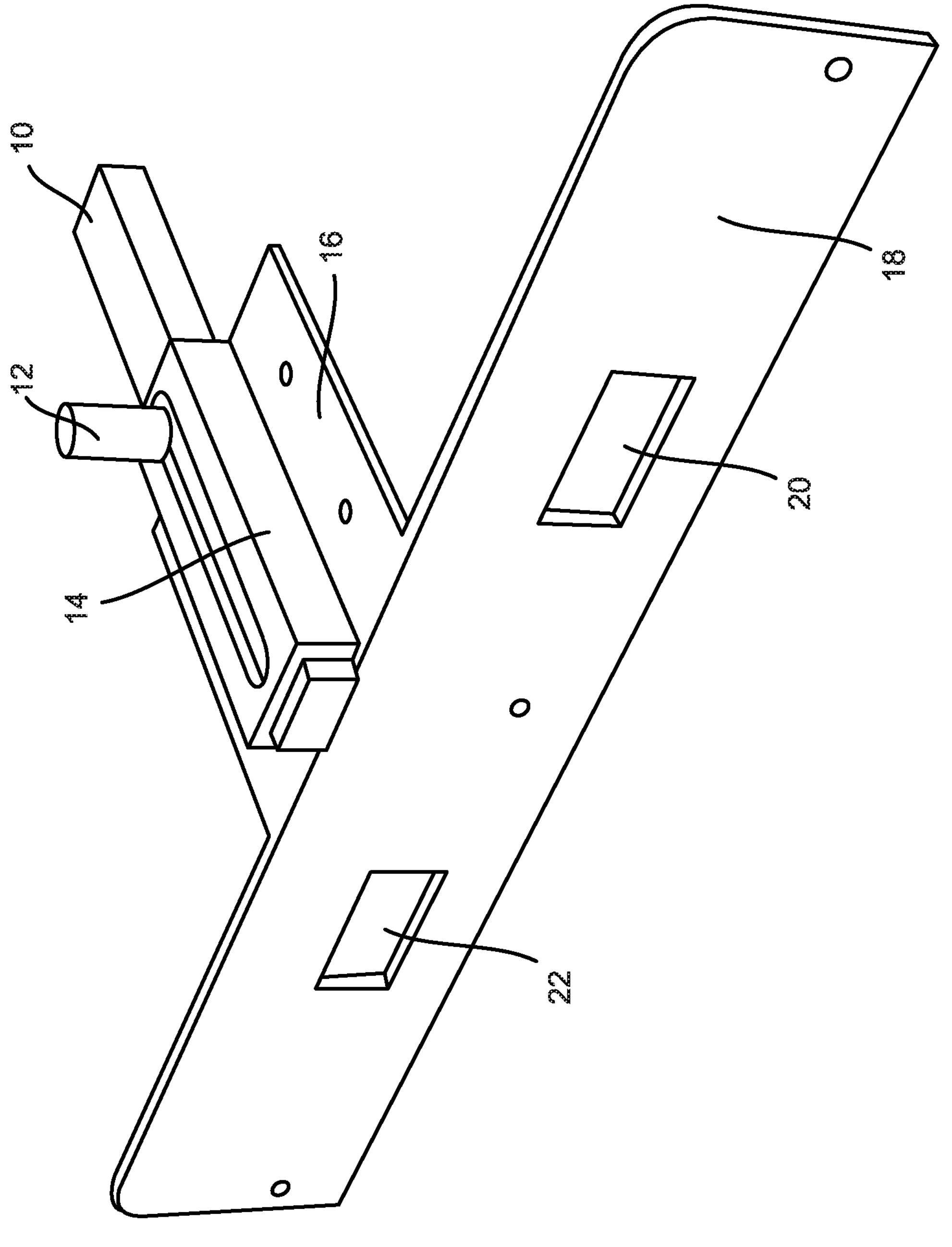
FIG. 1 is a perspective view of the deadbolt door locking apparatus according to one embodiment of the invention.

The present invention has utility as a deadbolt door locking apparatus. Representative benefits of the present invention include providing a level of strength and durability to a door frame and a deadbolt door locking apparatus and also a degree of security from unauthorized intrusion into a structure.

In view of the foregoing disadvantages inherent in the known types of deadbolt locking mechanisms, this invention provides a deadbolt door locking apparatus with increased force resistance and load bearing capacity spread in a continuum across the entire deadbolt door locking apparatus, thereby minimizing the potential for cracking of the deadbolt and a door frame thus increasing the overall utility so as to more effectively secure a structure from unauthorized forceful intrusion through resort to a deadbolt door locking apparatus having a deadbolt contained within a housing having an aperture and backed with a door frame mounting plate, a handle protruding from the deadbolt and sliding in the aperture between an extended position with the deadbolt overlying a door and a retracted position with the deadbolt clear of a door, a door jamb mounting plate integral with the housing and extending perpendicularly from the housing and an optional door-mounted deadbolt housing made adapted to receive a deadbolt that is in an engaged position, overlying a door. In certain embodiments, the deadbolt, mounting plate, housing and optional door-mounted housing are made of steel, bronze or brass. In some embodiments, the deadbolt is a rectangular cuboid having a length of at least one and a half times the length of the door frame mounting plate. In other embodiments, the deadbolt is a cylinder, trapezoidal prism, hexagonal prism or octagonal prism having a length of between one inch and four inches. In some embodiments, the mounting plate includes a second cut-out adapted to receive a deadbolt that is integral to a door and extends out from door into a door jamb. In certain embodiments the door frame mounting plate has a length equal to the distance between the top of the door latch cut-out and the bottom of the second deadbolt cut-out, both within the mounting plate. In other embodiments, the mounting plate has a thickness of bet one sixteenth of an inch and one quarter of an inch and has a length of at least three times the length of the door frame mounting plate. In certain embodiments, the deadbolt includes a circular hole of sufficient size drilled through a point on the deadbolt such as to accommodate a padlock to allow use of the deadbolt door locking apparatus to secure a door that opens to the exterior, away from a structure. In still other embodiments, the deadbolt has a coating of phosphorescent paint.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

With reference now to the drawing, the preferred embodiment of the deadbolt door locking apparatus is herein described. It should be noted that the articles "a", "an", and "the", as used in this specification, include plural referents unless the content clearly dictates otherwise.

The present invention represents a departure from the prior art in that the security of a structure is enhanced by use of the deadbolt door locking apparatus of the present invention that affords an increased level of force resistance and load bearing capacity spread in a continuum across the entire apparatus of the present invention, thereby alleviating the problem of having hyper-localized stress on a deadbolt and doorframe, thus making a deadbolt and doorframe less likely to crack thereby making unauthorized intrusion into a structure becoming more difficult to achieve. In certain embodiments, this is accomplished by utilizing a door jamb mounting plate integral with, and extending perpendicularly from, a deadbolt housing that is secured to a door frame, thereby allowing the entire locking apparatus to exist as one cohesive unit and allowing for diffusion of any force applied to be spread in a continuum across the entire apparatus, minimizing potential deadbolt weak spots and mitigating excessive stress on a door frame. The ninety degree angle formed along the integration axis of the door jamb mounting plate and deadbolt housing further allows for increased strength and durability of the deadbolt door locking apparatus imparting increased force resistance and load bearing capacity to the deadbolt door locking apparatus. In certain embodiments, this is accomplished by providing a closed-loop reinforcement system—when pressure is exerted upon a door, the portion of the deadbolt overlying the door moves with the door, slightly away from the structure, but also transfers a portion of that pressure to the non-functional portion of the deadbolt, contained within the deadbolt housing which is mounted to the door frame. This transferred pressure is applied to the door frame via the non-functional portion of the deadbolt, adding strength to the door frame and integrated mounting plate, reinforcing the entire deadbolt door locking apparatus, thereby making a deadbolt and door frame less prone to cracking and unauthorized intrusion into a structure more difficult to achieve, resulting in increased security to a structure.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

An embodiment of the inventive deadbolt door locking apparatus is shown in FIG. 1. The deadbolt 10 has a longitudinal axis and a handle 12 protruding from one face. It is appreciated that the deadbolt 10 is made of steel, bronze or brass. While the deadbolt 10 depicted herein is shown as a rectangular cuboid, it is appreciated that the deadbolt 10 can be in the form other geometric shapes such as a cylinder, trapezoidal prism, hexagonal prism or octagonal prism. The deadbolt 10 is contained within a housing 14 made of steel, bronze or brass and having an external face having an aperture through which the handle 12 protrudes and slides between an extended position with the deadbolt 10 overlying the door, and a retracted position with the deadbolt 10 clear of the door. The housing 14 has a first wall and a second wall together containing the deadbolt 10 and linking the external face to a door frame mounting plate 16. A mounting plate 18 having a cut-out 20 adapted to receive a door latch extending from the door into a door jamb is integral with the housing 14 and extends perpendicularly from the housing 14. In certain inventive embodiments, the mounting plate 18 can optionally contain a second cut-out 22 adapted to receive a deadbolt integral to a door and extending from the door into a door jam. While the mounting plate 18 depicted herein is shown having a length of at least twice the extended position of the of the deadbolt 10, it is appreciated that the mounting plate 18 can have varying lengths relative to other components of the present invention such as a length of at least three times the length of the door frame mounting plate 16. It is also appreciated that the mounting plate 18 is made of steel, bronze or brass and has a thickness of between one sixteenth of an inch and one quarter of an inch. In other embodiments, the door frame mounting plate 16 can have varying lengths relative to the dimensions of the other components of the present invention such as having a length equal to the distance between the top of the door latch cut-out 20 within the mounting bracket 18 and the bottom of the second deadbolt cut-out 22 within the mounting plate 18. The mounting plate is integral with the door frame mounting plate, meaning they are formed from a single piece of metal that is bent to include a right angle bend, thereby forming a bracket. In certain inventive embodiments, the deadbolt 10 has a length of at least one and a half times the length of the door frame mounting plate 16. In other embodiments, the deadbolt 10 has a length such that, when the deadbolt is in an extended position overlying the door, the non-functional distal end of the deadbolt 10 remains flush with the far edge of the door frame mounting plate 16. In still other inventive embodiments, the deadbolt 10 has a length such that, when the deadbolt is in a retracted position clear of the door, the functional end of the deadbolt 10 is flush with the mounting plate 18. In certain embodiments, the deadbolt 10 has a length of between one inch and four inches. It is appreciated that the deadbolt 10 of any of the foregoing embodiments can optionally include a coating of phosphorescent paint applied to its exterior.

Figure 2:
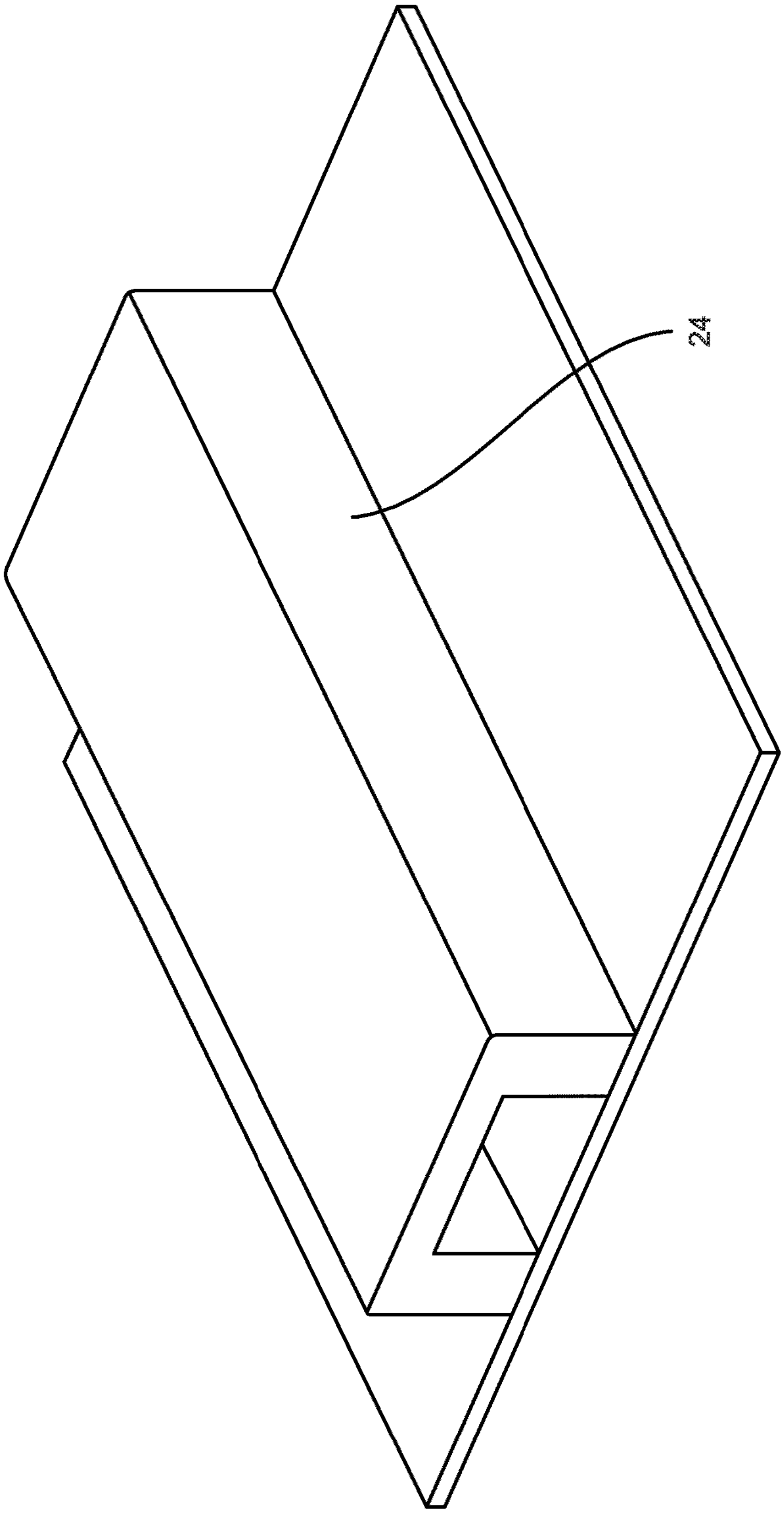
FIG. 2 is a perspective view of the optional door-mounted housing component of the deadbolt door locking apparatus shown in FIG. 1.

An embodiment of a door-mounted deadbolt housing 24 as an optional component of the inventive door locking apparatus is shown in FIG. 2. In certain inventive embodiments, the door-mounted deadbolt housing 24 is made of steel, bronze or brass.

Figure 3:
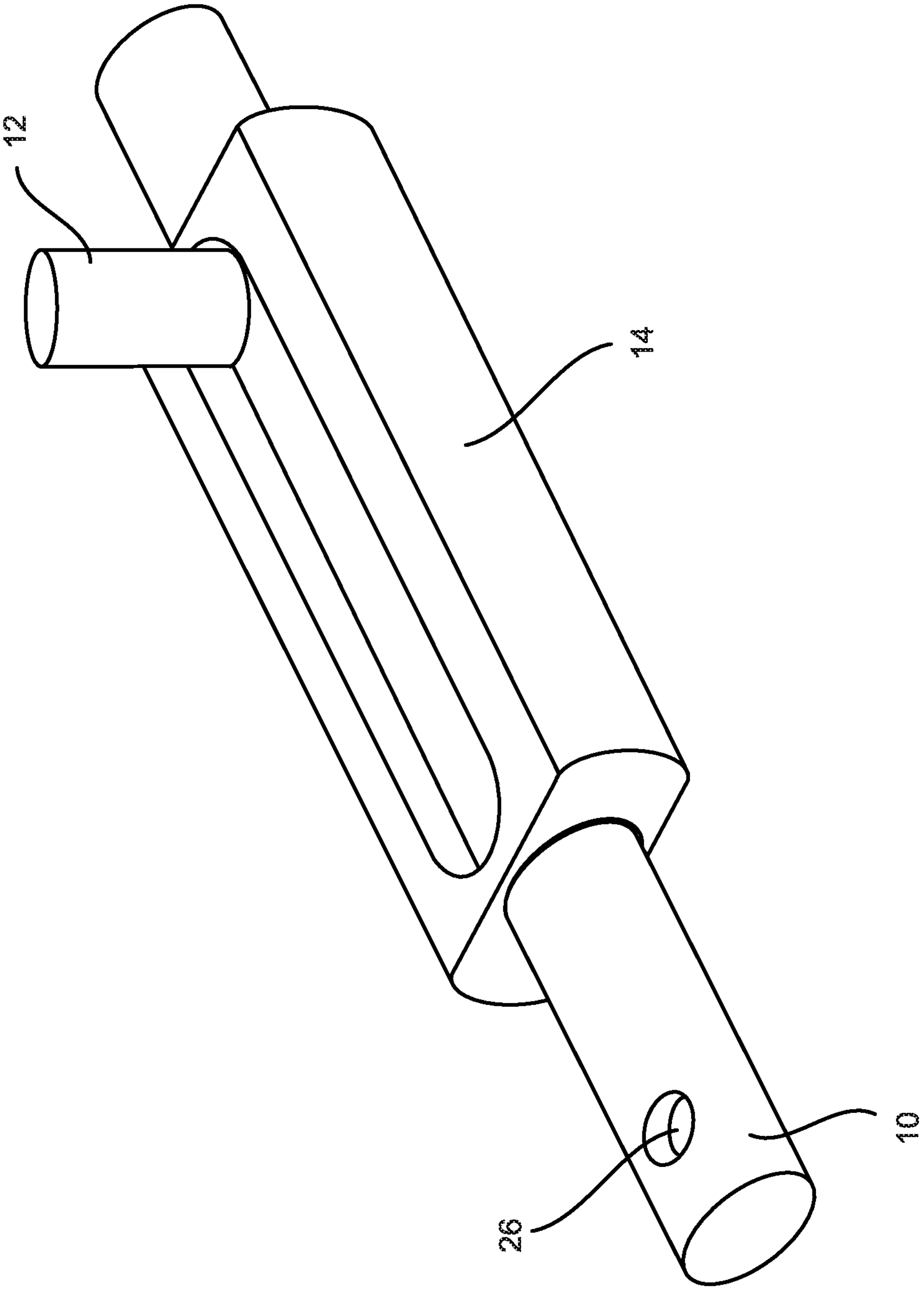
FIG. 3 is a magnified view of the deadbolt door locking apparatus of FIG. 1 with a circular hole drilled through a point on the deadbolt according to one embodiment of the invention.

A certain embodiment of the inventive door locking apparatus with a circular hole 26 drilled through the deadbolt 10 is shown in FIG. 3. It is appreciated that the circular hole 26 is of sufficient size such as to accommodate a padlock so that the inventive door locking apparatus can optionally be used to secure a door that opens to the exterior, away from a structure.

The present invention is further detailed with respect to the following examples. These examples are not intended to limit the scope of the claims appended hereto.

EXAMPLE 1

A deadbolt lock with the ratio of dimensions as shown in FIG. 1 and a mounting plate length of 3 inches is fabricated and evaluated for strength in a door jamb made of kiln-dried, paint grade Douglas fir 2×4s and a solid core exterior door. The mounting plate and door frame mounting plate are formed of a unitary piece of 14 gage steel with a ratio of the mounting bracket length being 3× the extended position of the deadbolt. The lock is retained with #10 screws: 1.5 inches length engaging the door jamb and ¾ inch length engaging the door. This lock is currently commercially available as DURA-GUARD DOOR DEFENDER™.

The resulting mounted door with the inventive lock is tested against forced entry and is impervious to repeated kicking by a 200 pound human male.

The door is next tested with a 2.5 inch diameter sledge hammer that is hingably mounted in an inverted configuration by the handle from above the door to contact the door overlying the lock. Weights are added to the head and the handle raised until it defines a 60 degree angle relative to vertical and released. The lock is able to withstand 500 pounds per square inch force applied and thus exceeds forces a human could deliver and far exceeds ANSI Grade 1 requirements as to 10× 70 pound kicks.

COMPARATIVE EXAMPLE

The above door lock is symmetrically cutdown along the mounting plate to a length of 2 inches and mounting holes therein redrilled 0.5 inches in from the original position; the mounting plate length being less than 2× the extended position of the deadbolt. The above tests are repeated without passing the above kick and sledge hammer tests with failure being by screw pull out.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

Although the present invention has been described with reference to preferred embodiments, numerous modifications and variations can be made and still the result will come within the scope of the invention. No limitation with respect to the specific embodiments disclosed herein is intended or should be inferred.

The invention claimed is:

1. A deadbolt door locking apparatus for a side hinged door surrounded by a door frame the deadbolt door locking apparatus comprising:

a door frame mounting plate having a length extending from a first edge that is free to an oppositely opposed second edge and having a width extending from a first free side to an oppositely opposed second free side;

a deadbolt having a longitudinal axis, said deadbolt having a length of at least one and a half times the length of said door frame mounting plate and made of steel;

a handle protruding from said deadbolt;

a first housing for said deadbolt having an external face with an aperture, said handle sliding in the aperture between an extended position with said deadbolt overlying the door to lock the door, and a retracted position with said deadbolt clear of the door, said housing having a first wall and a second wall that together bound said deadbolt and connect the external face to said door frame mounting plate when mounted to the door frame; and a mounting plate having a length extending from a third free side to a fourth free side and having a width extending from a third edge that is free to a fourth edge, the third edge and the fourth edge lying in a common plane, the length of said mounting bracket being such that the third free side and the fourth free side of said mounting plate extend beyond the width of said door frame mounting plate, said mounting plate and said door frame mounting plate being formed of a single piece of material that is bent to form a ninety degree angle between mounting bracket and said door frame mounting plate, a portion of the fourth edge of said mounting plate being integral with the second edge of said door frame mounting plate along the entire width of said door frame mounting plate, said mounting plate being planar and defining a first rectilinear cut-out in an area of said mounting plate that is offset from said door frame mounting plate such that the rectilinear cut-out is offset from said door frame mounting plate, the first rectilinear cut-out adapted to receive a door latch extending from the door into a door jamb, the length of said mounting plate being at least twice the extended position of said deadbolt when mounted to the door frame and at least three times the length of said door frame mounting plate.

2. The deadbolt door locking apparatus of claim 1 wherein when said deadbolt is in the extended position overlying the door, a non-functional distal end of said deadbolt is flush with the first edge of said door frame mounting plate.

3. The deadbolt door locking apparatus of claim 1 wherein when said deadbolt is in the retracted position clear of the door, a functional end of said deadbolt is flush with said mounting plate.

4. The deadbolt door locking apparatus of claim 1 wherein said mounting plate further comprises a second cut-out adapted to receive a deadbolt integral to the door and extending from the door into the door jamb.

5. The deadbolt door locking apparatus of claim 1 wherein said mounting plate is made of one of steel, bronze, or brass.

6. The deadbolt door locking apparatus of claim 1 wherein said housing is made of one of steel, bronze, or brass.

7. The deadbolt door locking apparatus of claim 1 wherein said mounting plate has a thickness of between one sixteenth of an inch and one quarter of an inch.

8. The deadbolt door locking apparatus of claim 1 wherein said mounting plate has a length of at least three times the length of said door frame mounting plate.

9. The deadbolt door locking apparatus of claim 4 wherein the length of said door frame mounting plate is equal to the distance between a top of the first cut-out within said mounting plate and a bottom of the second cut-out within said mounting plate.

10. The deadbolt door locking apparatus of claim 1 further comprising a second housing for said deadbolt having an external face, a first wall, and a second wall connecting the external face to a door mounting plate, said second housing adapted to receive said deadbolt when said deadbolt is in the extended position overlying the door.

11. The deadbolt door locking apparatus of claim 10 wherein said second housing is made of one of steel, bronze, or brass.

12. The deadbolt door locking apparatus of claim 1 wherein said deadbolt further comprises a circular hole of sufficient size drilled through a point on said deadbolt such as to enable accommodation of a padlock such that said deadbolt door locking apparatus can optionally be used to secure a door that opens to the exterior away from a structure.

13. A deadbolt door locking apparatus for a side hinged door surrounded by a door frame, the deadbolt door locking apparatus comprising:

a door frame mounting plate having a length extending from a first edge that is free to an oppositely opposed second edge and having a width extending from a first free side to an oppositely opposed second free side;

a deadbolt having a longitudinal axis, said deadbolt being a rectangular cuboid having a length of at least one and a half times the length of said door frame mounting plate and made of steel;

a handle protruding from said deadbolt;

a first housing for said deadbolt having an external face with an aperture, said handle sliding in the aperture between an extended position with said deadbolt overlying the door to lock the door, and a retracted position with said deadbolt clear of the door, said housing having a first wall and a second wall that together bound said deadbolt and connect the external face to said door frame mounting plate;

a mounting plate having a length extending from a third free side to a fourth free side and having a width extending from a third edge that is free to a fourth edge, the third edge and the fourth edge lying in a common plane, the length of said mounting plate being such that the third free side and the fourth free side of said mounting plate extend beyond the width of said door frame mounting plate, a portion of the fourth edge of said mounting plate being connected to the second edge of said door frame mounting plate along the entire width of said door frame mounting plate and forming a ninety degree angle along an integration axis of said mounting plate and said door frame mounting plate, thereby forming a bracket, said mounting plate being planar and defining a first rectilinear cut-out in an area of said mounting plate that is offset from said door frame mounting plate such that the rectilinear cut-out is offset from said door frame mounting plate, the first rectilinear cut-out adapted to receive a door latch extending from the door into a door jamb, the length of said mounting plate is at least three times the length of the door frame mounting plate; and a coating of phosphorescent paint on said deadbolt.

* * * * *